United States Patent [19]

Peng

[11] Patent Number: 5,790,594

[45] Date of Patent: Aug. 4, 1998

[54] HIGH SPEED MODEM AND METHOD FOR EXPEDITED TIMING RECOVERY

[75] Inventor: Marcia Man Peng, Medway, Mass.

[73] Assignee: Motorola, Inc., Schaumburg, Ill.

[21] Appl. No.: 508,854

[22] Filed: Jul. 28, 1995

[51] Int. Cl.$^6$ ................................ H04B 1/38; H04L 5/16
[52] U.S. Cl. ..................... 375/222; 375/226; 375/371; 375/376; 370/516
[58] Field of Search ........................... 375/204, 222, 375/224, 226, 371, 376; 370/210, 503, 516

[56] References Cited

U.S. PATENT DOCUMENTS

| | | | |
|---|---|---|---|
| 4,630,314 | 12/1986 | Smith | 375/285 |
| 4,987,569 | 1/1991 | Ling et al. | 370/32.1 |
| 5,048,054 | 9/1991 | Eyuboglu et al. | 375/222 |
| 5,319,636 | 6/1994 | Long et al. | 379/410 |

Primary Examiner—Don N. Vo
Attorney, Agent, or Firm—Darleen J. Stockley; Jeffrey T. Klayman

[57] ABSTRACT

The modem (300, 400) and method (700) of the present invention minimize the time required for the timing tracking system for phase lock loops in high speed modems, thus aiding systems that have short convergence periods in training. The present invention shortens the time for PLL convergence by initializing the PLL with values that approximate the actual timing frequency offsets.

13 Claims, 5 Drawing Sheets

*700*

```
DETERMINING ESTIMATES OF A TIMING FREQUENCY OFFSET
WHEREIN AT LEAST ONE OF A1-A4;
A1) FOR AN INTERNAL TIMING SOURCE IN A REMOTE
MODEM, UTILIZING LINE PROBING TIMING FREQUENCY ESTIMATION
TO DETERMINE AN ESTIMATE
A2) FOR AN EXTERNAL TIMING SOURCE IN A REMOTE
MODEM, UTILIZING THE ABOVE MENTIONED PREDETERMINED IMPLEMENTATION
STRATEGY TO DETERMINE TOFF ESTIMATE DURING THE PPP SEQUENCE
IN PHASE III,
A3) FOR A LOOPBACK TIMING SOURCE IN A REMOTE
MODEM,
A3A) WHERE LOCAL MODEM IS A CALL
MODEM, UTILIZING A PREDETERMINED IMPLEMENTATION STRATGY
TO DETERMINE AN ESTIMATE OF THE TOFF FOR PHASE III PLL INITIALIZATION,
AT THE BEGIN OF THE PHASE IV SETTING THE TOFF ESTIMATE TO ZERO, AND
A3B) WHERE A LOCAL MODEM IS AN ANSWER MODEM,
A3B1) WHERE A LOCAL MODEM USES AN EXTERNAL
TIMING SOURCE, USING A TX TRACKER VALUE TO DETERMINE THE TOFF
ESTIMATE FOR PHASE III, AND
A3B2) WHERE A LOCAL MODEM USES INTERNAL TIMING, SETTING THE
ESTIMATE FOR THE PLL TO ZERO IN PHASE III, AND
A4) FOR LAL TESTING, WHERE A LOCAL TIMING
SOURCE IS INTERNAL, SETTING THE ESTIMATE TO ZERO, AND WHERE
THE LOCAL TIMING SOURCE IS EXTERNAL, THE TOFF ESTIMATE IS CALCULATED
USING A PREDETERMINED IMPLEMENTATION STRATEGY IN PHASE III AND
REDETERMINED FROM THE TX TRACKER OFFSET VALUE AT THE BEGINNING
OF PHASE IV
```
*702*

```
INITIALIZING THE PHASE LOCKED LOOP TO THE ESTIMATE UPON
COMPLETION OF THE PP CHIRP SEQUENCE IN PHASE III, AND WHEREVER NECESSARY
REINITIALIZING THE PLL WITH THE CORRESPONDING PHASE IV ESTIMATE
AT THE BEGINNING OF PHASE IV
```
*704*

FIG.6 WITH CRYSTAL TX TRACKER WITH HARDWARE PLL AND RX TRACKER WITH SOFTWARE PLL

FIG.7 700

DETERMINING ESTIMATES OF A TIMIMG FREQUENCY OFFSET WHEREIN AT LEAST ONE OF A1-A4;

A1) FOR AN INTERNAL TIMING SOURCE IN A REMOTE MODEM, UTILIZING LINE PROBING TIMING FREQUENCY ESTIMATION TO DETERMINE AN ESTIMATE

A2) FOR AN EXTERNAL TIMING SOURCE IN A REMOTE MODEM, UTILIZING THE ABOVE MENTIONED PREDETERMINED IMPLEMENTATION STRATEGY TO DETERMINE TOFF ESTIMATE DURING THE PPP SEQUENCE IN PHASE III,

A3) FOR A LOOPBACK TIMING SOURCE IN A REMOTE MODEM,

A3A) WHERE LOCAL MODEM IS A CALL MODEM, UTILIZING A PREDETERMINED IMPLEMENTATION STRATGY TO DETERMINE AN ESTIMATE OF THE TOFF FOR PHASE III PLL INITIALIZATION. AT THE BEGIN OF THE PHASE IV SETTING THE TOFF ESTIMATE TO ZERO, AND

A3B) WHERE A LOCAL MODEM IS AN ANSWER MODEM,

A3B1) WHERE A LOCAL MODEM USES AN EXTERNAL TIMING SOURCE, USING A TX TRACKER VALUE TO DETERMINE THE TOFF ESTIMATE FOR PHASE III, AND

A3B2) WHERE A LOCAL MODEM USES INTERNAL TIMING, SETTING THE ESTIMATE FOR THE PLL TO ZERO IN PHASE III, AND

A4) FOR LAL TESTING, WHERE A LOCAL TIMING SOURCE IS INTERNAL, SETTING THE ESTIMATE TO ZERO, AND WHERE THE LOCAL TIMING SOURCE IS EXTERNAL, THE TOFF ESTIMATE IS CALCULATED USING A PREDETERMINED IMPLEMENTATION STRATEGY IN PHASE III AND REDETERMINED FROM THE TX TRACKER OFFSET VALUE AT THE BEGINNING OF PHASE IV

— 702

INITIALIZING THE PHASE LOCKED LOOP TO THE ESTIMATE UPON COMPLETION OF THE PP CHIRP SEQUENCE IN PHASE III, AND WHEREVER NECESSARY REINITIALIZING THE PLL WITH THE CORRESPONDING PHASE IV ESTIMATE AT THE BEGINNING OF PHASE IV

— 704

HIGH SPEED MODEM AND METHOD FOR EXPEDITED TIMING RECOVERY

FIELD OF THE INVENTION

The present invention relates to timing in a modem for a communication system, and more particularly, to timing systems in modems.

BACKGROUND

In a data communication network, digital data among other data, may be communicated at a data signaling rate from one modem to another modem through a communication media, which may be a leased line of the network or a dial-up connection of a general switched telephone network (GSTN), for example. Generally, modems operate at a fixed carrier frequency and a fixed symbol rate and attempt to optimize the data signaling rate based on the conditions of the communication media over which they are communicating. In order to accomplish an optimum data signaling rate, contemporary modems, International Telecommunication Union, Telecommunications Standardization Sector (ITU-T) Recommendation V.34, utilize a startup learning procedure before commencing communication during which the modems perform certain predefined start up procedures which include a line probing section (phase 2), for example, to establish the media characteristics over which communication will take place, and a training section (phase 3 & 4) to train the equalizer, echo canceller, carrier and timing frequency offsets compensation systems (PLLs). The current state of the art ITU-T standard for two wire full duplex modems is V.34. An example of a modem employing the V.34 standard today includes the Motorola Codex Model 3260 Fast.

Since synchronous receiving and coherent demodulation are performed, it is important that the receiver (RX) tracks the remote transmitter's (TX) timing frequency and locks its own onto it. In some modems, for example, the V.34 modems, a timing recovery phase locked loop (PLL) is utilized that can adjust its tracking speed adaptively, which provides a reduced steady state noise margin, but suffers from a slow initial tracking speed. For a modem that complies with the V.34 standard, little time is allowed for the PLL to converge during training.

DETAILED DESCRIPTION OF A PREFERRED EMBODIMENT

The modem and method of the present invention minimize the time required for the timing tracking system for phase lock loops in modems, thus aiding systems that have short convergence periods in training. The present invention shortens the time for PLL convergence by initializing the PLL with values that approximate the actual timing frequency offsets.

Figure 1:
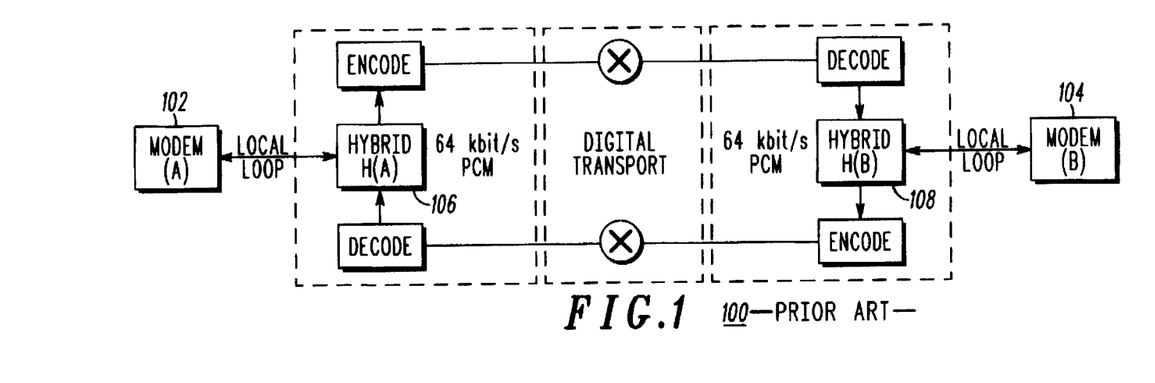
FIG. 1 is a block diagram illustration of an exemplary data communications network model suitable to describe the background environment of the present invention.

FIG. 1, numeral 100, is a block diagram of a network connection representation illustrating an exemplary data communications network model in which two modems denoted as A and B, of the two wire variety, are communicating through a general switched telephone network (GSTN). In this example, the modems A 102 and B 104 are coupled to the GSTN over two wire line connections to hybrids H(A) 106 and H(B) 108, respectively, which convert the two wire connections to four wire connections of the GSTN.

Figure 2:
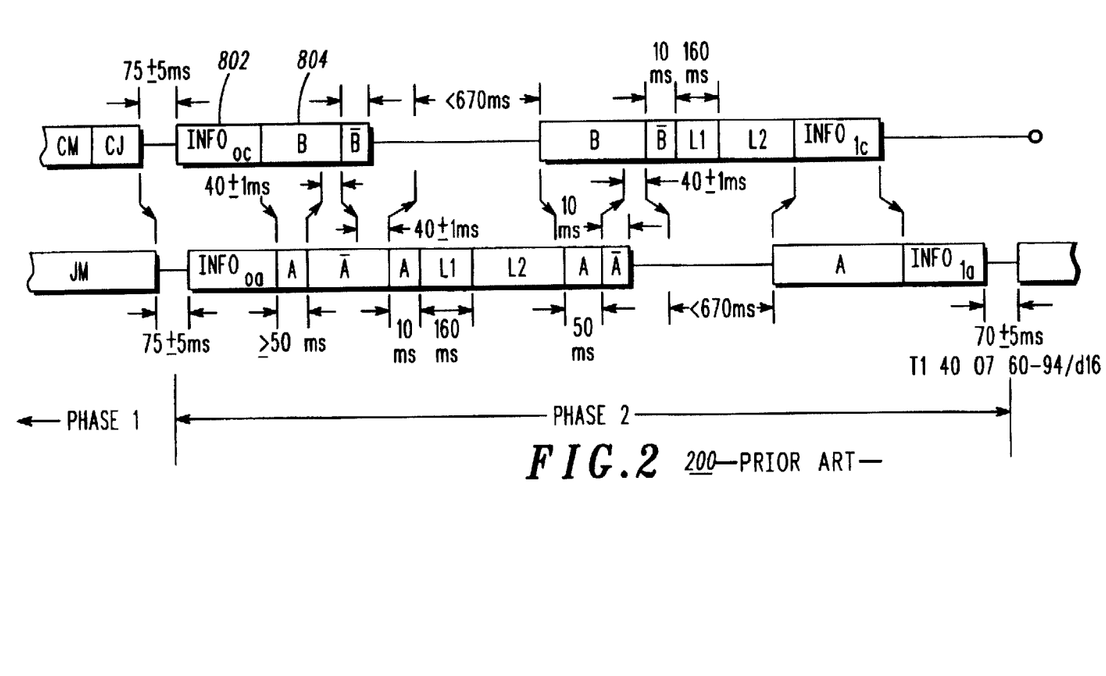
FIG. 2 is a diagram of phase 2 probing/ranging in accordance with V.34.
Figure 3:
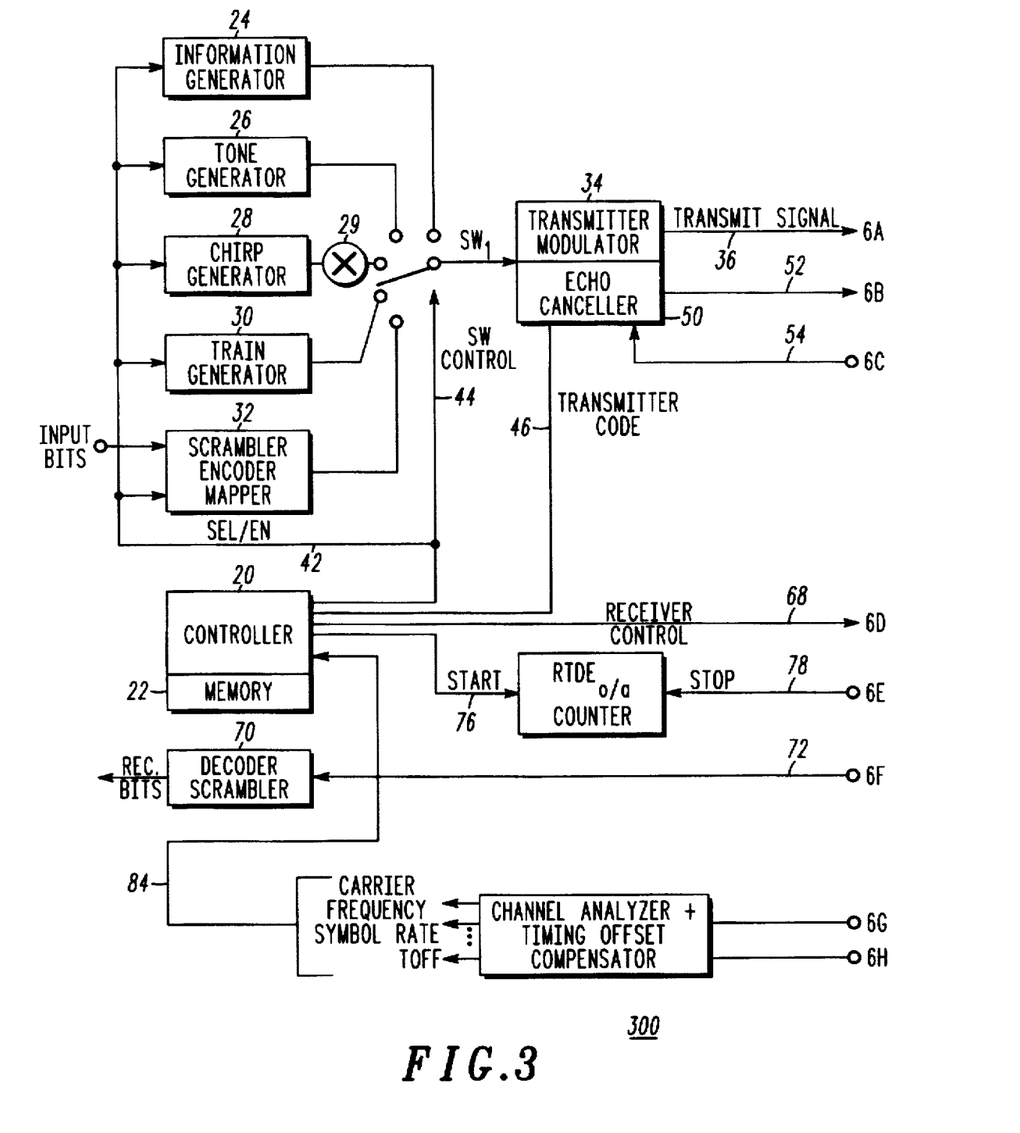
FIGS. 3–4 depict a functional block diagram schematic of a series of functional modules, including a timing PLL initialization unit for initializing the values of the phase locked loop in accordance with the present invention.
Figure 4:
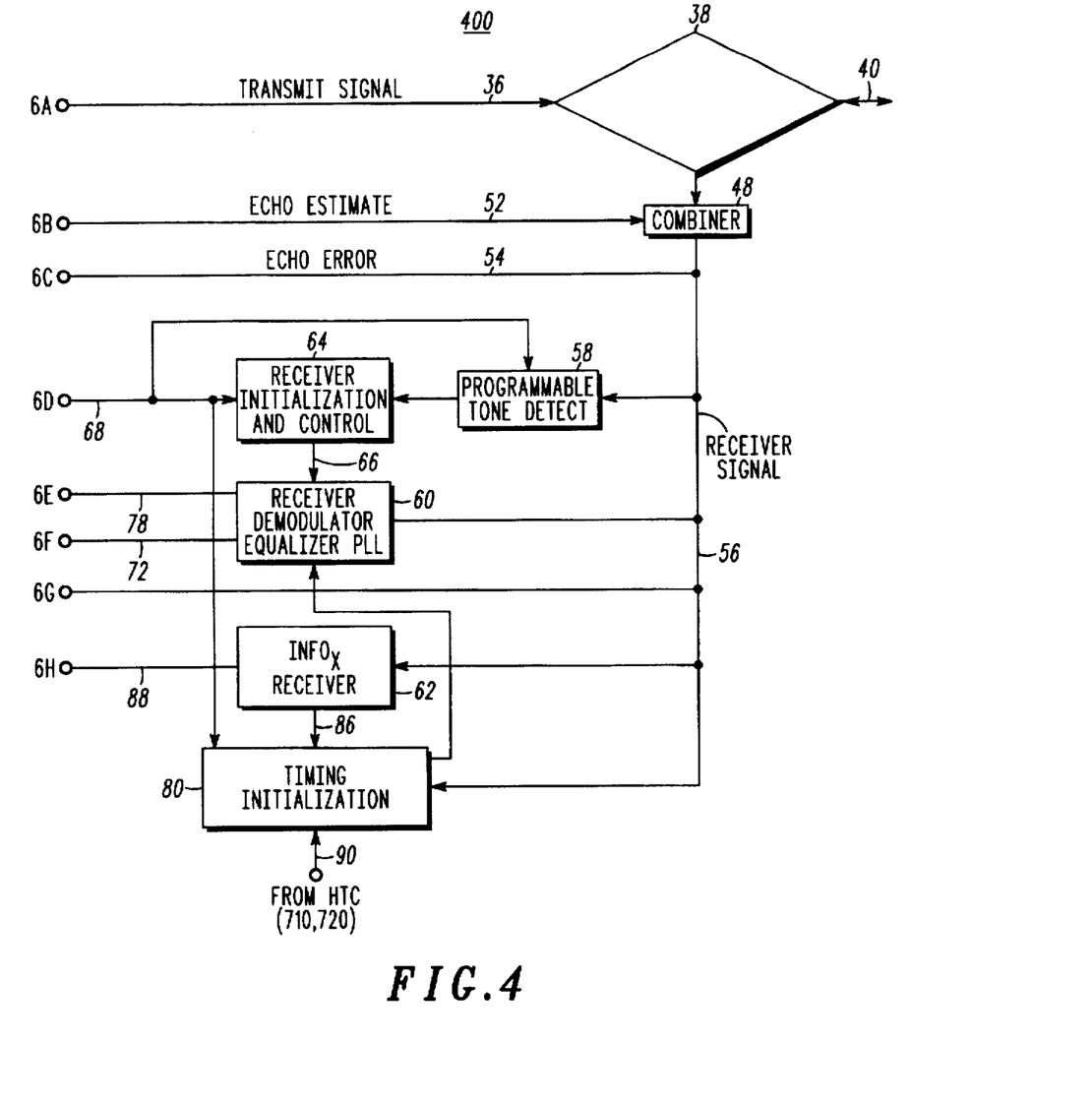

FIG. 2, numeral 200, is a diagram of phase 2 probing/ranging in accordance with V.34. FIGS. 3–4, numerals 300 and 400, depict a functional block diagram schematic of a two wire modem for operating in a full duplex mode and embodying the various aspects of the present invention. As in the Motorola/Codex model 3260 Fast, the function of the blocks of the embodiment of FIG. 3 may be implemented by at least one signal processor similar to the type manufactured for Motorola, Inc., formerly Codex Corporation, bearing Part No. 60423-51, for example. The modem processor(s) will not be described in detail herein as the use of a signal processor(s) in the control and implementation of modem functions is considered well-known.

At the heart of the exemplary modem is a functional controller module 20 which functions to provide information to the various other functional modules of the modem in accordance with a predetermined timing sequence which will be described in greater detail hereinbelow. The present modem is intended to operate with quadrature amplitude modulation (QAM) for each channel with synchronous line transmission at a selected one of the following plurality of modulation or symbol rates: 2400, 2743, 3000, 3200 and 3429 as will be more fully understood from the description herebelow. The present modem is also designed to operate at the following data rates: 2400, 4800, 7200, 9600, 12000, 14400, 16800, 19200, 21600, 24000, and 26400, 28800 bits per second. In the present embodiment, the above rates may use the Modulation Scheme, recommended by the ITU - T recommendation V.34. Still further, a plurality of carrier frequencies which may be used by the present modem include 1600 Hz, 1646 Hz 1680 Hz,1800 Hz, 1829 Hz, 1867 Hz, 1920 Hz 2000 Hz and 1959 Hz. A selected carrier frequency and symbol rate from the respective plurality of symbol rates and carrier frequencies, and the timing frequency offset (TOFF) between RX and the remote TX are established during a start up procedure after the line has been probed. Information representing the aforementioned predetermined carrier frequencies, symbol rates, and TOFF etc. are all stored in the memory 22 for a selection under control of the controller 20 as will be more evident from the description found below.

It is understood without having to be shown or described that the present exemplary modem includes conventional interchange modem circuits which comply with the functionality and operational requirements of the V.24 recommendation of the CCITT and all such interchange circuits are terminated in the corresponding data terminal equipment (DTE) and in the data circuits terminating equipment in accordance with appropriate recommendations for electrical characteristics. In addition, such modems accept and pass synchronous or asynchronous data from and to its corresponding DTE on the appropriate conventional interchange circuit and under control thereof. The timing, clocks ... etc., for example, data and control flow are all achieved through the conventional interchange circuits.

Referring again to FIGS. 3–4, the modem includes the following conventional signal generating functional modules: a INFO$_x$ generator 24, a tone generator 26, a chirp signal generator 28 with a gain multiplier 29, a train signal generator 30 and a conventional scrambler/encoder/mapper function 32 which processes the data to be transmitted. A functional switch SW1 selects the output of one of the generator modules 24, 26, 28, 30 or 32 to be an input to a transmitter/modulator functional module 34 which in turn generates a transmit signal 36. The gain multiplier 29 serves to control the output level of the chirp generator. The signal 36 is conducted through a hybrid circuit 38 to the two wire connection 40 to either a leased line or dial-up line of a telephone network. The generator functions 24, 26, 28, 30 and 32 are all selected and enabled by the controller 20 via the signal path 42. In addition, the functional switch module SW1 is also controlled by the controller 20 via the switch control path 44. Still further, information related to the carrier frequency, symbol rate, TOFF etc., along with certain control signals are provided to the transmitter/modulator 34 from the controller 20 over the data and control path 46.

Received signals are passed from the two wire line conductor 40 through the hybrid 38 to a combiner function 48 of the modem. A conventional echo canceller function 50 estimates an echo based on perceived characteristics of the channel in accordance information provided to it from the controller 20 via path 46. The echo canceller 50 provides the echo estimate to the combiner 48 over path 52 so that the received signal may be relieved of its echo component by the combiner 48. An echo error is provided back to the echo canceller 50 over path 54 in order to adjust the echo canceller to a more effective level.

The received signal from the combiner 48 is provided over the signal path 56 to a variety of additional functional modules of the modem including a conventional programmable tone detector module 58, a receiver/demodulator/ equalizer/PLL module 60 and a INFO$_x$ receiver 62. The modem further includes a receiver initialization and control functional module 64 which initializes and controls the module 60 via the signal path 66. In addition, the tone detect module 58 and initialization and control module 64 are governed by the controller 20 utilizing the path 68. The data output of the receiver module 60 is provided to a conventional decoder descrambler module 70 over the data path 72. The module 70 processes the data received. The timing initialization module 80 inaccordance with the present invention gathers information from the received signal, INFOx sequences, hardware TX timing PLL to determine a TOFF estimate and uses this estimate to initialize the RX software PLL in a way as will be described below.

Still further, the modem includes a counter 74 which is used to compute the range RTDEc or RTDEa, as the case may be, which will become more evident from the description found below. The counter 74 may be started by the controller 20 using path 76 and stopped by the receiver 60 using path 78.

The foregoing described modem may be controlled to initiate a call and thus, be operated in a call mode (hereinafter referred to as a call modem) or may be controlled to answer a call, and thus, be operated in an answer mode (hereinafter referred to as an answer modem).

An example of operation of the preferred modem embodiment described in connection with the schematic block diagram of FIGS. 3–4 will now be supplied in connection with the communication between a call/answer two wire modem pair which intend to communicate over a communication media such as a leased line (Private) or PSTN line of a telephone network like that described in connection with the network model of FIG. 1, supra.

After a call is initiated from a call modem, and the answer modem is connected to the line, the call and the answer modems proceed to interwork with each other as recommended by phase 1 with a CM/JM exchange as shown in FIG. 2, as specified by the ITU - T V.34 modem recommendation. After the completion of Phase 1 of the handshaking procedure, the call and the answer modems transmit 75 ms of silence. After the transmission of silence, the call modem then proceeds to send Info0c 202 followed by Tone B 204 and then commences transmitting a Tone B to the answer modem. Concurrently, a controller of the call modem initializes a module for the reception of a infomation sequence INFO0a . At this time, both modems may be set at a predetermined symbol timing, for example, the symbol timing of 2400 Hz.

Simultaneously, the answer modem similarly governs the transmission of the information sequence Info0a and the 2400 Hz tone and initializes a module to receive and detect Info0c.

Upon reception of Info0c, the answer modem initializes itself to detect Tone B, a 1200 Hz tone from the call modem while continuing to receive Info0c.

Upon detection of INFO$_{0a}$ the call modem then looks for Tone A, a 2400 Hz tone, and then upon detection of Tone A, the call modem initializes to detect the first phase reversal of Tone A (Tone A*). Upon detection of Tone A* the call modem sends a phase reversal of Tone B (Tone B*) for 10 ms. Concurrently therewith, the controller of the call modem starts a counter to measure the round trip delay RTDEc.

Thereafter, the call modem initializes the detect module to detect the phase reversed Tone A and controls the transmitter to transmit all zeroes, then looks for the phase reversal Tone A.

After receiving Tone B, the answer modem starts to send Tone A. After at least 50 ms of Tone A has been transmitted, the answer modem transmits a Tone A phase reversal. Simultaneously, the answer modem initializes its detect module to detect the phase reversal Tone B.

The answer modem then looks for the phase reversal Tone B and when it receives and detects the Tone B*, it computes a round trip delay RTDEa, causes the controller to wait for at least 40 +/-1 ms, and then controls the tone generator and transmitter to transmit a phase reversal Tone A* ( Tone A) for 10 ms. Thereafter, the controller of the answer modem initializes the echo and received signal analyzer to compute the channel characteristics estimation resulting from received echo signals of the first line probe signal L1. Simultaneously, the answer modem transmits line probe signal (L1) and setting gain 29 to +6 dB over nominal transmit level.

In the call modem, when the Tone A phase reversal is detected, the counter is stopped by the receiver module and the echo and received signal analyzer thereof is initialized to compute an estimation of channel characteristics from a received signal (L1). The resultant digital count of the counter is representative of the round trip delay or range between the two modems and is stored in the memory by the controller for later use in controlling the echo canceller.

In the present state, both the call modem and answer modem are initialized to estimate channel, noise characteristics, and as per the current invention, the timing frequency offsets for the phase locked loop.

In the present embodiment shown in FIG. 3, numeral 300, the controller 20 of the answer modem controls the chirp generator 28 with a gain unit 29, switch SW1 and transmitter 34 to transmit a line probing chirp signal which is typically a periodic signal comprised of a series of tones spaced at 150 Hz apart within a frequency band of 150 Hz–3750 Hz.

Figure 5:
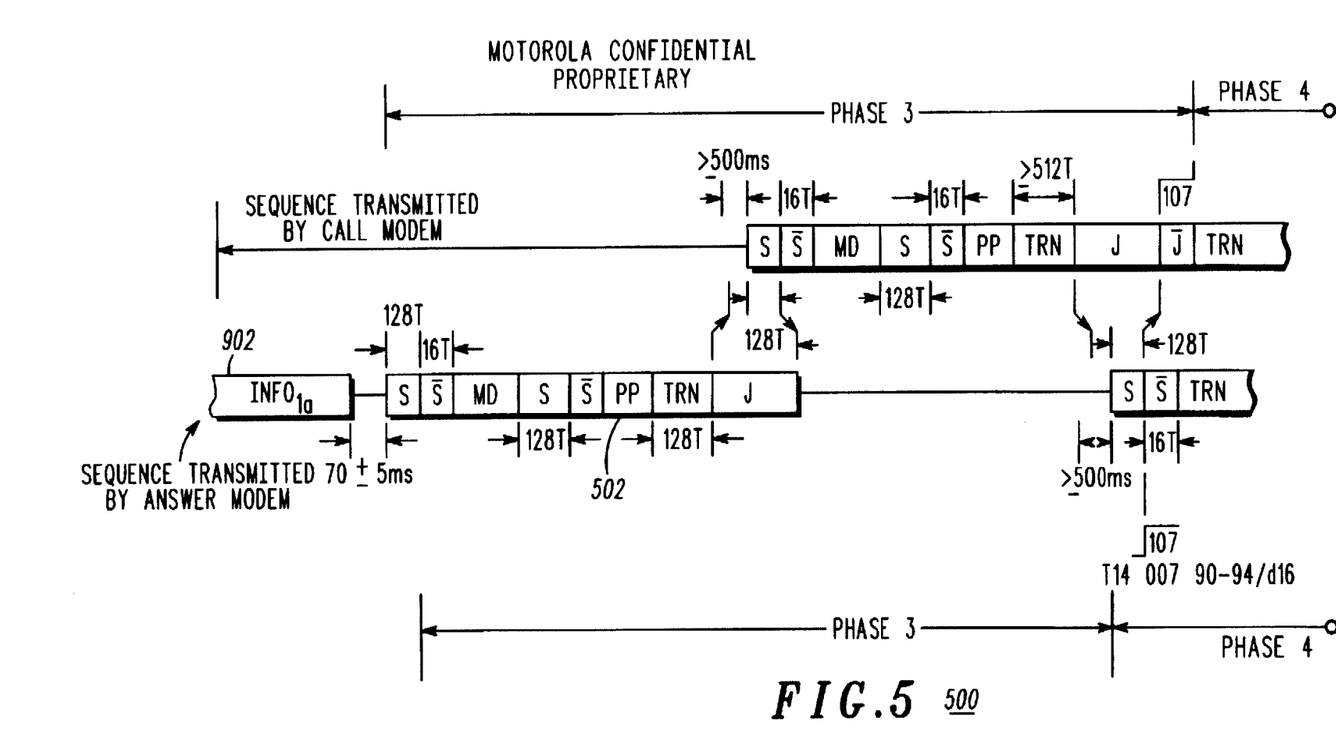
FIG. 5 is a diagram of phase 3 equalizer and echo canceller training that utilizes a chirp signal PP in accordance with the present invention, satisfying the requirements of V.34.

FIG. 5, numeral 500, is a diagram of phase 3 equalizer and echo canceller training that utilizes a chirp signal PP 502 in accordance with the present invention, satisfying the requirements of V.34. The S signal is 128 symbols long. Since 60 symbols are reserved for S detection and getting ready for S-bar detection, only about 60 symbols are left, which is not enough for TOFF acquisition. Thus, in the present invention, where the modem is conforming to the V.34 standard, the PP chirp signal 502 from phase III, which is 288 symbols long, is used for TOFF acquisition.

The PP chirp 502 consists of 6 periods of a 48-symbol polyphase sequence. However, there is a transition time from S-bar to PP in the first period, which equals the channel impulse response in length. Thus, only 5 periods or 240 symbols are reliable. Also, since a few symbols may be out of synchronization between the transmitter and receiver, the last period may run into the TRN sequence. Thus, only 4 periods are available. In the present invention, multi-frequency bins in band are utilized instead of only the bandedge bins.

In modem communication systems a user may utilize one of three different clock sources as basic timing source for the modem TX: (1) external timing source: a DTE provides clock to the modem, on which the TX timing is locked by TX tracker-a hardware PLL; (2) internal timing source: TX timing signal is derived from its own crystal; and (3) loop-back timing source: TX timing is locked on the RX timing in the same modem. There is also a special diagnostic case called local analog loopback (LAL) testing, which requires special timing consideration. The present invention provides for initializing each type of system with values approximating the actual timing frequency offsets, thus shortening the PLL convergence time period.

Figure 6:
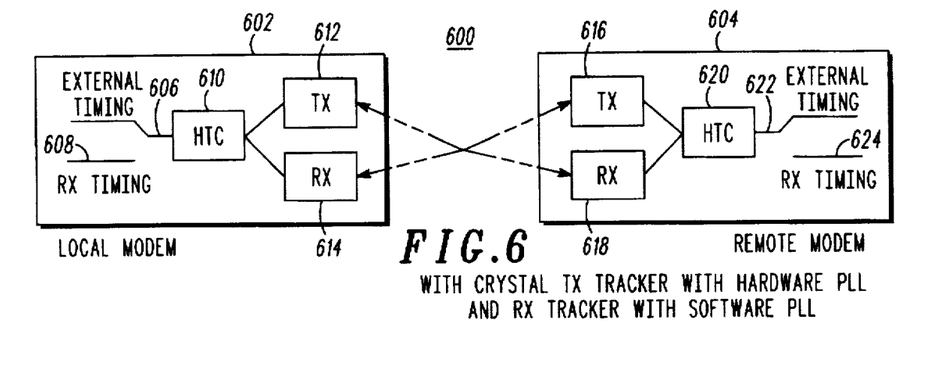
FIG. 6 is a schematic of a modem operation environment in accordance with the present invention.

FIG. 6, numeral 600, is a schematic of a modem operation environment in accordance with the present invention. The symbol timing is generated by a hardware timing circuitry (HTC) (610, 620) on each modem platform. In the HTC (610, 620), there is a single crystal (typically of 18432 KHz), a TX tracker and a RX tracker which enable the TX and RX to operate with independent timing clocks. In the TX tracker, there is a hardware PLL to track an external clock source when external timing is desired or track the RX timing source (608, 624) when loopback timing is required. The tracking speed of the hardware PLL is very fast, usually within milliseconds range. The RX tracker is controlled by the software PLL and is slower than the TX tracker. In the sequel, the notation PLL refers to the local RX software timing PLL, unless otherwise noted.

During normal operation, the timing of the RX in the local modem is typically the same as that of the TX in the remote modem, and the remote RX timing locks on that of the local TX.

In the V.34 standard, there are 2 bits in the $Info_0$ sequence for modems to use to exchange source timing information. The PLL initialization schemes of the present invention are individualized for the timing-frequency offset in the local modem under various timing setting situations.

When the remote modem uses an internal timing source, there is typically no timing change between phases. Thus, the line probing TOFF estimation is used to initialize the PLL at the beginning of phase III. With minimum alteration, the predetermined implementation strategy of the present invention can be applied to estimate TOFF in line probing during L1 and/or L2 sequence.

When the remote modem uses an external timing source, a timing change is more likely between phases. Typically, the change will occur between phases II and III. In this case, line probing estimation is no longer valid for the training phase. The predetermined implementation strategy (see below) of the present invention is utilized. The estimation is implemented during the phase III PP sequence. At the end of PP this estimation is used to initialize the PLL.

It is clear that the PP TOFF estimation works for both of the above cases. Since L1 and L2 sequences during line probing are much longer than PP, the line probing estimation is preferred when internal timing is used.

When the remote modem is on loopback timing, the local modem call and answer modes have different initialization schemes. When the local modem is a call modem, as shown in FIG. 5, numeral 500, the RX first receives the training sequence from the remote TX. During this period, the remote RX is idle and still uses the timing source learned during line probing and loops it back to the remote TX. This timing source could be either the local TX timing or the remote internal timing. Therefore, the predetermined implementation strategy (see below) is used to estimate the TOFF for phase III PLL initialization.

In phase IV, however, the remote RX has learned the local TX timing and loops it back to the remote TX. That is, the local RX should learn the timing of the local TX. At the beginning of phase IV, the PLL is initialized with zero offset if the local timing source is internal, or with the offset learned by the TX tracker if the local timing source is external.

When the local modem is an answer modem, by the time the local RX starts the training phase, the remote RX has already learned the timing of the local TX, and in turn the remote TX is using the local TX timing. If the local modem uses an external timing source, the TX tracker offset is used as the PLL initial value. If the local modem uses internal timing, the PLL is initialized with zero.

LAL is a special case in terms of the timing initialization since LAL does not use line probing, and there is no remote timing source involved. When the local timing source is internal, the PLL is initialized with zero. On the other hand, if the local timing source is external, the PLL is initialized with a TOFF estimation in phase III and is reinitialized with the offset learned by TX tracker at the beginning of phase IV.

With the above-described initialization techniques, the RX timing system of the present invention is efficient for a timing frequency offset up to 0.003% (only ±0.001% timing frequency offset is allowed in the V.series standards).

An example of the preferred embodiment of the predetermined implementation strategy of the present invention includes sampling, at the receiver, the RX filter output which is a baseband complex signal every T/3 seconds, where 1/T is the symbol rate. On 576 samples four 144 point discrete Fourier transforms, DFTs, $X1(k)$, $X2(k)$, $X3(k)$ and $X4(k)$ are determined, with $X1(K)$ using the first group of 144 samples, where $k=4,\ldots,23, 124,\ldots,143$. Then the first two and the last two DFTs are added together, $X1'(k)=X1(k)+X2(k)$, $X2'(k)=X3(k)+X4(k)$. Under the assumption that the phase shift during four periods of PP is small, the spectra $X1'(k)$ and $X2'(k)$ have the following relation, $$X2'(k)=X1'(k)\exp(\pm j2\pi 2\alpha k+j\theta c)$$

where θc is the accumulated phase due to carrier frequency offset. After the following multiplications $$X'(k)=X1'^*(k)X2'(k)=|X1'(k)|^2\exp(\pm j2\pi 2\alpha k+j\theta c)$$

and $$X(k)X(k)x'^*(k+N)=|X1'(k)X1'(k+N)|^2\exp(\pm j2\pi 2\alpha N)$$

where N is chosen to be 120 and k=4, . . . ,23, 20 X(k) bins are obtained. These 20 bins are further summed up $$Y=\exp(\pm j2\pi 2\alpha N)\sum_{4}^{23}|X1'(k)X1'(k+N)|^2$$

to filter out the noise. Because the phase angles are small (the maximum =0.2677 rad), the angle is obtained directly from the following division (the maximum error is less than 3%), $$\theta=4\pi N\alpha \approx \text{Imag}(Y)/\text{Real}(Y)$$

and the timing-frequency offset is obtained as α=θ/4πN.

To get the actual timing initialization to the PLL loop, the output is usually scaled by a constant scalar which is system dependent. Clearly, the number of frequency bins may be increased from 20 to 24. The scale factor may be predetermined analytically.

To implement this procedure, the timing and carrier phase PLL should not be updated during PP chirp sequence.

Clearly, the method of the present invention may be embodied in a Digital Signal Processor, DSP, an Application Specific Integrated Circuit, ASIC, a tangible medium of/for a computer, such as a computer diskette, or in a tangible medium such as a memory unit of a modem. Also, where selected, the predetermined implementation strategy alone may be implemented in an ASIC of a modem.

Figure 7:
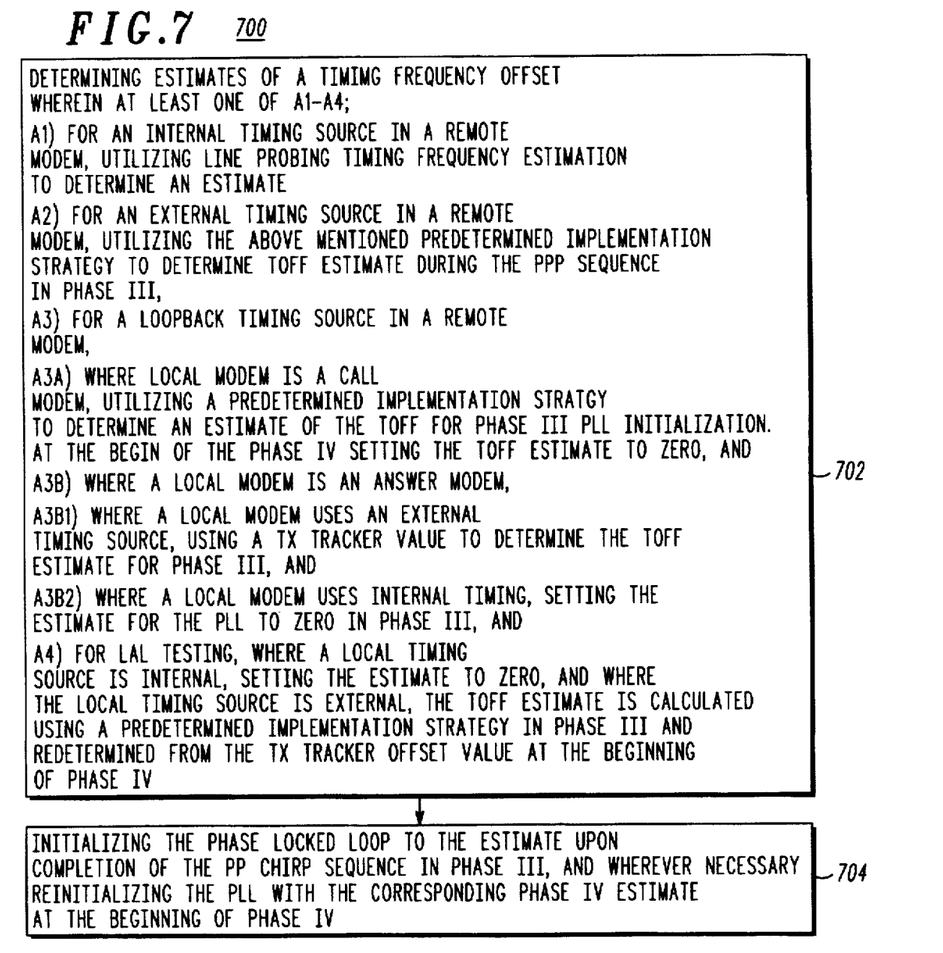
FIG. 7 is a flow chart of one embodiment of steps in accordance with the method of the present invention.

Thus, as shown in FIG. 7, numeral 700, a flow chart of one embodiment of steps in accordance with the method of the present invention, utilizing a chirp sequence for determining an estimate of timing frequency offset to minimize a time period for convergence of a phase locked loop in a modem, includes the steps of: A) determining estimates (702) of a timing frequency offset wherein at least one of A1–A4: A1) for an internal timing source in a remote modem, utilizing line probing timing frequency estimation to determine an estimate; A2) for an external timing source in a remote modem, utilizing the above mentioned predetermined implementation strategy to determine TOFF estimate during the PP sequence in phase III; A3) for a loopback timing source in a remote modem, A3a) where a local modem is a call modem, utilizing a predetermined implementation strategy to determine an estimate of the TOFF for phase III PLL initialization. At the begin of the phase IV setting the TOFF estimate to zero; and A3b) where a local modem is an answer modem, A3b1) where a local modem uses an external timing source, using a TX tracker value to determine the TOFF estimate, and A3b2) where a local modem uses inernal timing, setting the estimate for the PLL to zero, and A4) for LAL testing, where a local timing source is internal, setting the estimate to zero, and where the local timing source is external, the TOFF estimate is calculated using a predetermined implementation strategy in phase III and redetermined from the TX tracker offset value at the beginning of phase IV; and B) initializing the phase locked loop to the estimate (704) upon completion of the PP chirp sequence in phase III, and wherever necessary reinitializing the PLL with the corresponding phase IV estimate at the beginning of phase IV. Initializing the phase locked loop to the estimate is accomplished by the Timing Intialization Unit 80 of FIG. 4, which is coupled to controller 20, of FIG. 3.

Although an exemplary embodiment is described above, it will be obvious to those skilled in the art that many alternations and modifications may be made without departing from the invention. Accordingly, it is intended that all such alternations and modifications be included within the spirit and scope of the invention as defined in the appended claims.

We claim:

1. A method for expediting convergence of a phase locked loop during a training phase following a line probing phase in a modem, wherein a line probing timing frequency estimation is made during the line probing phase, the method comprising the steps of:

A) determining an estimate of a timing frequency offset;
  A1) utilizing, for an internal timing source in a remote modem, line probing timing frequency estimation to determine the estimate,
  A2) for an external timing source in the remote modem, utilizing a predetermined implementation strategy to determine a TOFF estimate during a PP chirp sequence in phase III,
  A3) for a loopback timing source in the remote modem,
    A3a) utilizing, where a local modem is a call modem, the predetermined implementation strategy to determine an estimate of the TOFF for a phase III phase locked loop initialization, and at the beginning of the phase IV, setting the estimate of the TOFF to zero, and
    A3b) where the local modem is an answer modem,
      A3b1) using, where the local modem uses an external timing source, a TX tracker value to determine the TOFF estimate for phase III, and
      A3b2) where the local modem uses internal timing, setting the estimate for the phase locked loop to zero in phase III, and
  A4) setting, for LAL testing, where a local timing source is internal, the estimate to zero, and where the local timing source is external, calculating the TOFF estimate using the predetermined implementation strategy in phase III and redetermined from the TX tracker offset value at the beginning of phase IV, and B) initializing the phase locked loop to the estimate upon completion of the PP chirp sequence in phase III, and where selected, reinitializing the phase locked loop with a corresponding phase IV estimate at the beginning of phase IV.

2. The method of claim 1 wherein the predetermined implementation strategy includes:

A) sampling, at a receiver of a modem, an RX filter output which is a baseband complex signal every T/P seconds, where T is time, 1/T is a symbol rate and P is an integer where P≧2, B) determining four 48 X P point discrete Fourier transforms, DFTs, to obtain X1(k), X2(k), X3(k) and X4(k), where k=4, . . . ,23, P-20, . . . P-1, C) adding a first two and the last two DFTs together to obtain spectra X1' and X2':
X1'(k)=X1(k)+X2(k),
X2'(k)=X3(k)+X4(k), D) multiplying a conjugate of X1'(k) by X2'(k) to obtain X'(k)=X1'*(k) X2'(k), E) multiplying X'(k) by a conjugate of X'(k+P-20) to obtain X(k)=X'(k)X'*(k+P-20), where k=4, . . . ,23, F) summing up 20 X(k) (k=4, . . . ,23) to get a single complex number Y, G) determining phase angle of q=imag(Y)/real(Y) and H) dividing q by 4p(P-20) to obtain a timing frequency offset output a.

3. The method of claim 2 wherein the timing frequency offset output is further scaled by a predetermined constant scalar.

4. The method of claim 2 wherein the predetermined implementation strategy is embodied in a Digital Signal Processor, DSP.

5. The method of claim 2 wherein the predetermined implementation strategy is embodied in an Application Specific Integrated Circuit, ASIC.

6. The method of claim 2 wherein the steps for the predetermined implementation strategy are embodied in a tangible medium of/for a computer.

7. The method of claim 6 wherein the tangible medium is a computer diskette.

8. The method of claim 2 wherein the steps for the predetermined implementation strategy are embodied in a tangible medium of a computer program of a memory unit of a modem.

9. A modem that expedites convergence of a phase locked loop during a training phase following a line probing phase in a modem, wherein a line probing timing frequency estimation is made during the line probing phase the modem comprising:

A) a timing initialization unit, coupled to a controller, for determining an estimate of a timing frequency offset by:

A1) for an internal timing source in a remote modem, utilizing line probing timing frequency estimation to determine the estimate, A2) for an external timing source in the remote modem, utilizing a predetermined implementation strategy to determine a TOFF estimate during a PP chirp sequence in phase III, A3) for a loopback timing source in the remote modem,
A3a) utilizing, where a local modem is a call modem, the predetermined implementation strategy to determine an estimate of the TOFF for a phase III phase locked loop initialization, and at the beginning of the phase IV, setting the estimate of the TOFF to zero, and
A3b) where the local modem is an answer modem,
A3b1) using, where the local modem uses an external timing source, a TX tracker value to determine the TOFF estimate for phase II, and
A3b2) where the local modem uses internal timing, setting the estimate for the phase locked loop to zero in phase II, and A4) for LAL testing, where a local timing source is internal, setting the estimate to zero, and where the local timing source is external, calculating the TOFF estimate using the predetermined implementation strategy in phase III and redetermined from the TX tracker offset value at the beginning of phase IV, and B) the controller, coupled to the timing initialization unit, for scheduling the timing initialization unit to obtain the estimate and initializing the phase locked loop to the estimate upon completion of the PP chirp sequence in phase III, and where selected, reinitializing the phase locked loop with a corresponding phase IV estimate at the beginning of phase IV.

10. The modem of claim 9 wherein the predetermined implementation strategy includes:

A) sampling, at a receiver of a modem, an RX filter output which is a baseband complex signal every T/P seconds, where 1/T is the symbol rate and P≥2, B) determining four 48 X P point discrete Fourier transforms, DFTs, to obtain X1(k), X2(k), X3(k) and X4(k), where k=4, . . . ,23, P-20, . . . P-1, C) adding the first two and the last two DFTs together to obtain spectra X1'and X2':
X1'(k)=X1(k)+X2(k),
X2'(k)=X3(k)+X4(k), D) multiplying the conjugate of X1'(k) by X2'(k) to obtain X'(k)=X1'*(k) X2'(k), E) multiplying X'(k) by the conjugate of X'(k+P-20) to obtain X(k)=X'(k)X'*(k+P-20), where k=4, . . . ,23, F) summing up 20 X(k) (k=4, . . . ,23) to get a single complex number Y, G) determining phase angle of q=imag(Y)/real(Y) and H) dividing q by 4p(P-20) to obtain a timing frequency offset output a.

11. The modem of claim 9 wherein the timing frequency offset output is further scaled by a predetermined constant scalar.

12. The modem of claim 10 wherein the predetermined implementation strategy is embodied in an Application Specific Integrated Circuit, ASIC.

13. The modem of claim 10 wherein the predetermined implementation strategy is embodied in computer software stored a tangible medium of a memory unit of the modem.

* * * * *

UNITED STATES PATENT AND TRADEMARK OFFICE
CERTIFICATE OF CORRECTION

PATENT NO.  : 5,790,594
DATED       : August 4, 1998
INVENTOR(S) : Marcia Man Peng It is certified that error appears in the above-identified patent and that said Letters Patent is hereby corrected as shown below:

Column 10,
Line 2, delete "II" and substitute -- III --
Line 6, delete "II" and substitute -- III --

Signed and Sealed this

Twenty-eighth Day of August, 2001

*Attest:*

*Attesting Officer*

NICHOLAS P. GODICI
*Acting Director of the United States Patent and Trademark Office*